United States Patent [19]

Winskas

[11] 3,966,250

[45] June 29, 1976

[54] ENCLOSING STRUCTURE FOR THE LOAD BED OF A PICKUP TRUCK

[76] Inventor: Andrew B. Winskas, 504 Janine Lane, Schaumburg, Ill. 60172

[22] Filed: Jan. 27, 1975

[21] Appl. No.: 544,565

[52] U.S. Cl. ............................. 296/1 R; 296/23 MC
[51] Int. Cl.² ......................................... B60P 3/34
[58] Field of Search ............ 296/26, 27, 10, 23 MC, 296/23 C, 23 F, 23 G, 23 R, 1 R; 52/79

[56] References Cited
UNITED STATES PATENTS

| | | | |
|---|---|---|---|
| 2,382,376 | 8/1945 | Black | 296/27 |
| 2,834,632 | 5/1958 | Mattox | 296/27 |
| 2,879,103 | 3/1959 | Hall | 296/23 C |
| 3,103,709 | 9/1963 | Bolt | 52/79 |
| 3,290,084 | 12/1966 | McPherson | 296/23 MC |
| 3,356,410 | 12/1967 | Taylor | 296/27 |
| 3,547,481 | 12/1970 | Gleason | 296/23 MC |
| 3,683,571 | 8/1972 | Walz et al. | 52/79 |

FOREIGN PATENTS OR APPLICATIONS

| | | | |
|---|---|---|---|
| 271,388 | 5/1927 | United Kingdom | 296/23 C |

*Primary Examiner*—Robert J. Spar
*Assistant Examiner*—Winston H. Douglas
*Attorney, Agent, or Firm*—Shlesinger, Arkwright, Garvey & Dinsmore

[57] ABSTRACT

An enclosing structure for the load bed of a pickup truck capable of converting the truck to a small utility truck, large utility truck or camper. The structure includes a base section which is supported on the bed of the truck and overhangs the side panels, an upper section which attaches to the lower section and cooperates therewith to enclose the load bed of the truck, a first pair of doors hingedly secured to the base section, and a second pair of doors hingedly secured to the upper section. The upper section may constitute either a camper upper unit or utility truck extension or may be eliminated entirely and the roof structure secured directly to the lower section thereby forming a small utility truck.

2 Claims, 10 Drawing Figures

ENCLOSING STRUCTURE FOR THE LOAD BED OF A PICKUP TRUCK

BACKGROUND OF THE INVENTION

The invention relates generally to structures which enclose the load bed of a standard pickup truck thereby converting it to a camper or utility truck, and more particularly to a structure including two main sections, one of which is interchangeable.

Although the prior art is replete with structures for converting a pickup truck to campers, utility trucks, etc., they are generally of one-piece construction and accordingly do not possess the necessary flexibility for rapid conversion between various types of truck bodies. In other words, they are designed for only one use, e.g., as a camper but not a utility truck, a utility truck but not a camper, a small utility truck but not a large utility truck. To convert the pickup truck to more than one of these aforementioned vehicles necessitates that a separate enclosing structure be purchased or rented. Not only does this present an additional expense, but constitutes needless duplication since the lowermost portion of these enclosing structures are usually very similar.

In the case of campers which overlie a portion of the truck cab, storage is a problem because its somewhat irregular shape often requires that the front portion be supported by means of legs or the like when it is not mounted on the vehicle. Also, the height of the rear portion of the camper renders storage in a suspended position such as a garage attic or other convenient place most difficult.

OBJECTS OF THE INVENTION

It is, therefore, an object of this invention to provide an enclosing structure for the load bed of a pickup truck which includes an upper and lower section, the upper section being one of various interchangeable sections so as to convert the pickup truck to an enclosed utility truck or, alternatively, a camper.

Another object of this invention is to provide an enclosing structure for the load bed of pickup truck wherein the uppermost section may be lifted off the lower section and stored suspended above the pickup truck.

A further object of this invention is to provide a two-piece enclosing structure for the load bed of a pickup truck which may be rapidly and easily assembled.

Yet another object of this invention is to provide an enclosing structure for the load bed of a pickup truck which may be easily stored when not in use.

These and other objects will be apparent from the detailed description and drawings.

SUMMARY OF THE INVENTION

An enclosing structure for the load bed of a pickup truck comprising: a base section having a lower portion adapted to be supported on the floor of the truck bed and lie between the side panels thereof, and an upper portion, which is open at the top and wider than the lower portion, and is adapted to extend over the side panels of the truck; the base section including a rear wall having a top edge and a first opening extending to the edge; first door means attached to the base section rear wall and covering the first opening; a separate upper section on top of the base section, the upper section including a roof portion and being open on the bottom so as to cooperate with the base section to form a generally enclosed structure; the upper section further including a rear wall having a bottom edge, the bottom edge being adjacent the top edge of the base section; a second opening in the upper section rear wall extending to the bottom edge and being laterally coextensive with the first opening adjacent the top and bottom edges of the base and upper sections, respectively, so as to cooperate with the first opening to form a single larger opening; second door means attached to the upper section rear wall and covering said second opening; and means for removably securing the upper section to the base section.

DETAILED DESCRIPTION

Figure 1:
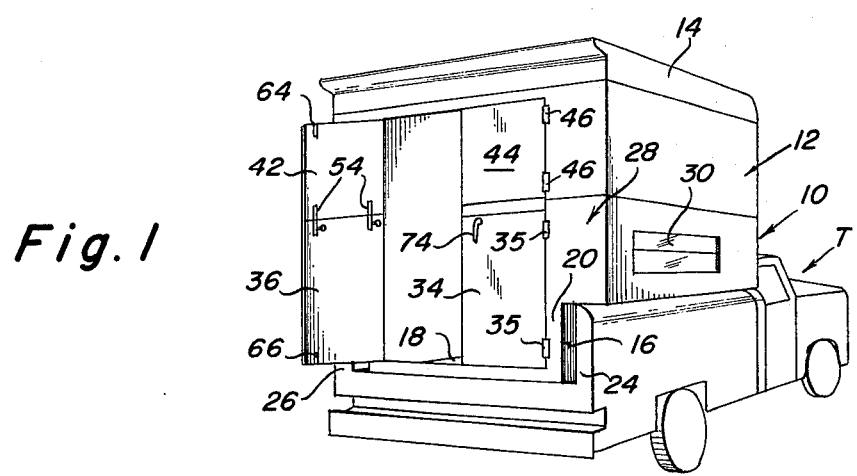
FIG. 1 is a perspective view of an enclosing structure of the present invention mounted on a standard pickup truck and converting it to a large utility truck.

The enclosing structure of the present invention is shown in FIG. 1 attached to the load bed of a standard pickup truck T and comprises generally a base section 10 and an upper section 12, the latter including a roof structure 14.

The base section 10 includes a lower portion 16 having a floor 18 and side walls 20 and 22. The lower portion 16 is supported on the floor of the truck bed and lies between the truck side panels 24 and 26; blocks or other suitable spacing means (not shown) may be placed between the side walls 20 and 22 and the truck panels 24 and 26 in the event that the lower portion 16 does not conform exactly to the bed of the truck. The base section 10 also has an upper portion 28 which is wider than the lower portion 16 and overhangs the truck panels 24 and 26. Suitable windows 30 may be provided if desired.

Figure 5:
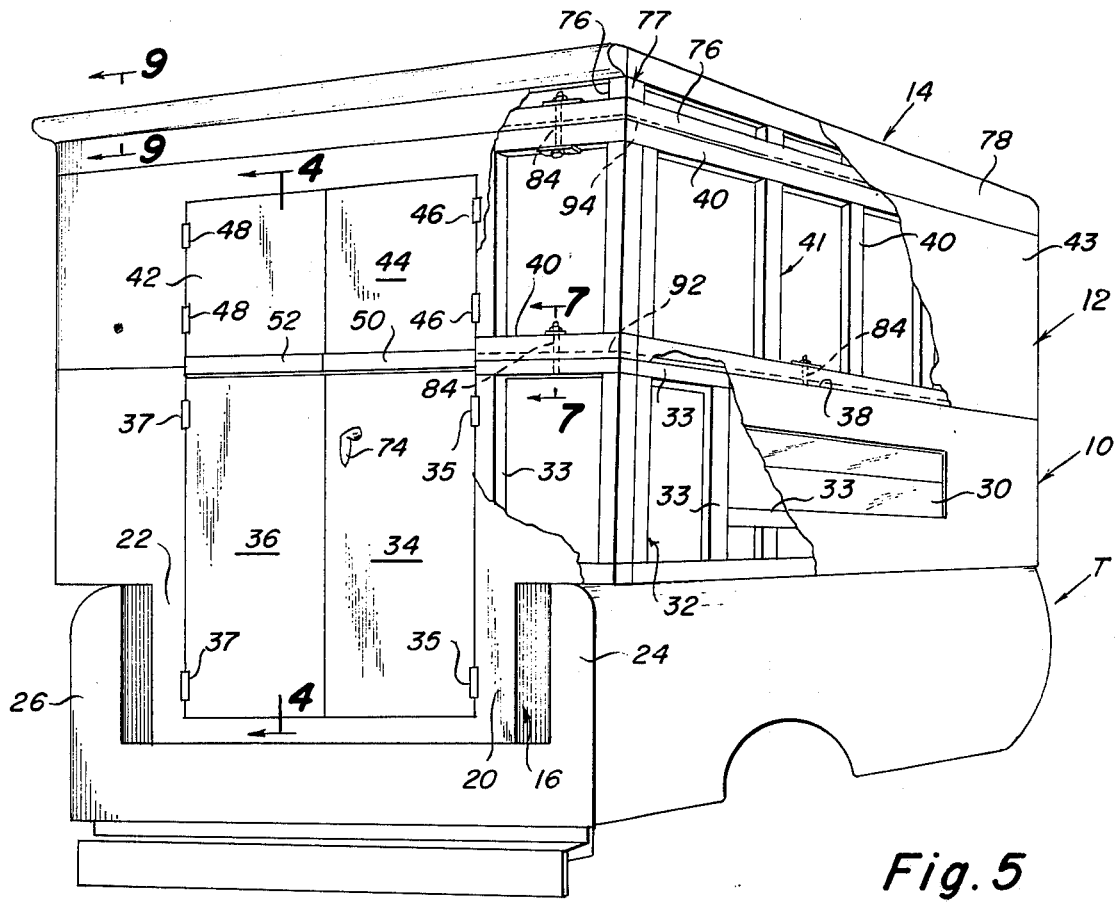
FIG. 5 is a fragmentary perspective view of the enclosing structure and pickup truck of FIG. 1 with portions thereof broken away to illustrate the details of construction.

Referring to FIG. 5, the base section 10 is a shell which comprises a frame 32 made of a plurality of wooden studs 33 which are nailed, screwed or otherwise secured together to form a supporting frame and which are then covered with a suitable metal exterior sheathing material. Other appropriate materials for the studs 33 would be steel or plastic and the sheathing may be made of aluminum siding, plywood, molded plastic, etc. Furthermore, it would be obvious to make the sections 10, 12 and 14 each of onepiece molded plastic or fiberglass wherein the reinforcing elements and sheathing are integral. The base section 10 is open at the top so as to cooperate with the upper section 12 to form a completely enclosed structure. A pair of doors 34 and 36 are pivotally mounted to base section 10 by means of hinges 35 and 37 so as to swing about parallel vertical axes. The open position of door 36 is illustrated in FIG. 1.

Figure 4:
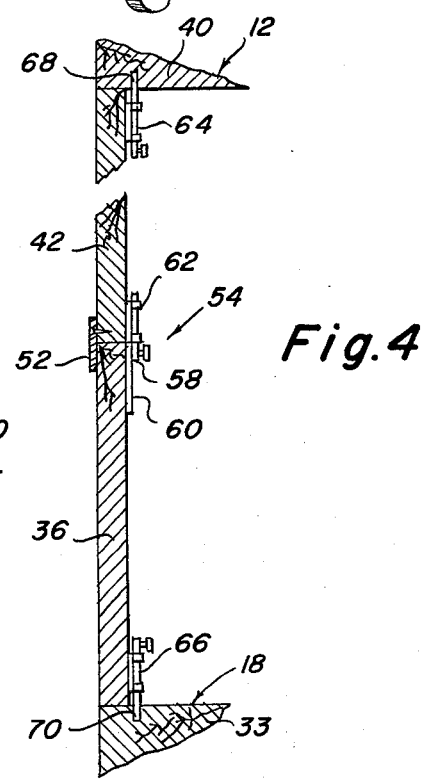
FIG. 4 is a sectional view of FIG. 5 taken along line 4—4 and viewed in the direction of the arrows.

Upper portion 12 is a rectangular shell open at both the top and bottom and, in similar fashion to base section 10, comprises a plurality of studs 40 which are fastened together to form a supporting frame 41 and are covered with suitable metal sheathing 43. It is supported on the upper edge 38 of base section 10 and secured thereto by means of a plurality of fastening devices which will be described in greater detail below. In the utility truck mode illustrated in FIGS. 1 and 5, upper section 12 has length and width dimensions which are identical to the dimensions of the upper edge 38 of base section 10. A pair of doors 42 and 44 are hingedly mounted to upper section 12 by means of hinges 46 and 48 and includes a pair of weather strips 50 and 52 which overlap doors 34 and 36, respectively, as best illustrated in FIG. 4.

Figure 3:
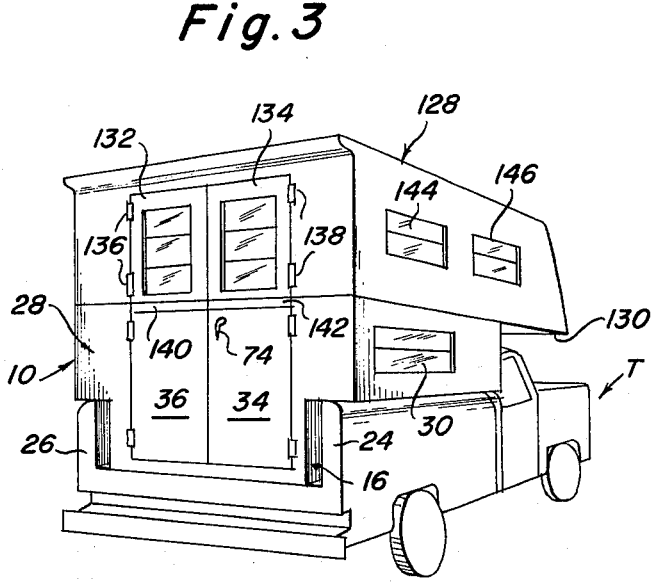
FIG. 3 is a perspective view of an enclosing structure according to the present invention mounted on a standard pickup truck and converting it to a camper vehicle.

In the large utility truck mode of the invention shown in FIG. 1 or the camper mode shown in FIG. 3, upper door 42 and lower door 36 are locked together by means of sliding bolt lock 54; a similar bolt lock (not shown) is provided for door 34 and 44. Referring to FIG. 4, bolt lock 54 is illustrated. It comprises a bolt 58 which is slidably mounted to a plate 60, the latter being rigidly secured to door 36, and a cooperating keeper 62 which is secured to door 42. Doors 42 and 36 are also provided with sliding bolts 64 and 66, respectively, which slide into recesses 68 and 70 in the door frame studs 40 and 33. This provides the option of latching doors 42 and 36 closed and permitting access into the interior 72 of the enclosure through doors 44 and 34. Door 34 may be provided with any appropriate latch mechanism 74.

Figures 9, 10:
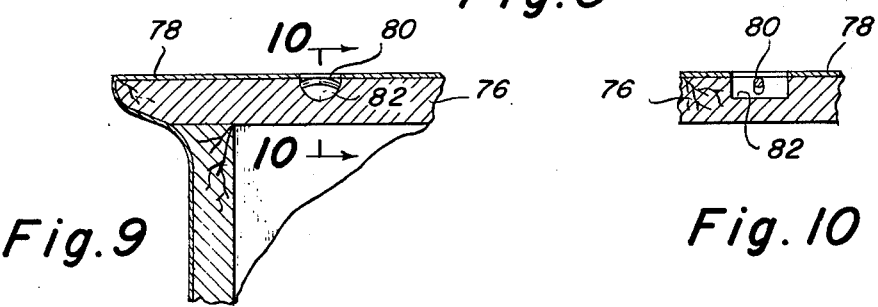
FIG. 9 is a sectional view of FIG. 5 taken along line 9—9 and viewed in the direction of the arrows.
FIG. 10 is a sectional view of FIG. 9 taken along line 10—10 and viewed in the direction of the arrows.

The roof structure 14 comprises a plurality of studs 76 which are secured together to form a frame 77 and covered with suitable metal sheathing 78. The roof 14 is secured to upper section 12 by means of appropriate fastening devices which will be described in detail below. To permit the roof 14 and upper section 12 to be lifted off the base section 10, a plurality of lifting eyes 80 are provided in recesses 82 in roof 14 as illustrated in FIGS. 9 and 10. Preferably, at least three such lifting eyes would be provided.

Various alternative means for securing section 12 to roof 14 and base section 10 may be employed. A preferred fastening device 84 is shown in FIG. 5 and in detail in FIG. 7 and comprises a threaded bolt 86 which passes through the lower of adjacent frames (e.g. frame 32) and is secured thereto by means of a thin nut 88 which is positioned in a recess 90. Resilient gaskets 92 and 94 are positioned between frames 32 and 41 and frames 41 and 77, respectively, for the purpose of rendering the enclosure waterproof. The bolt 86 also passes through the upper frame 41 which is secured thereto by means of nut 96; plates 98 and 100 serve as washers for bolt 86. Since the bolts 86 are rigidly fastened to the base section 10 and upper section 12, they function as guides for properly positioning the upper section 12 and roof 14, respectively.

Figures 6, 7, 8:
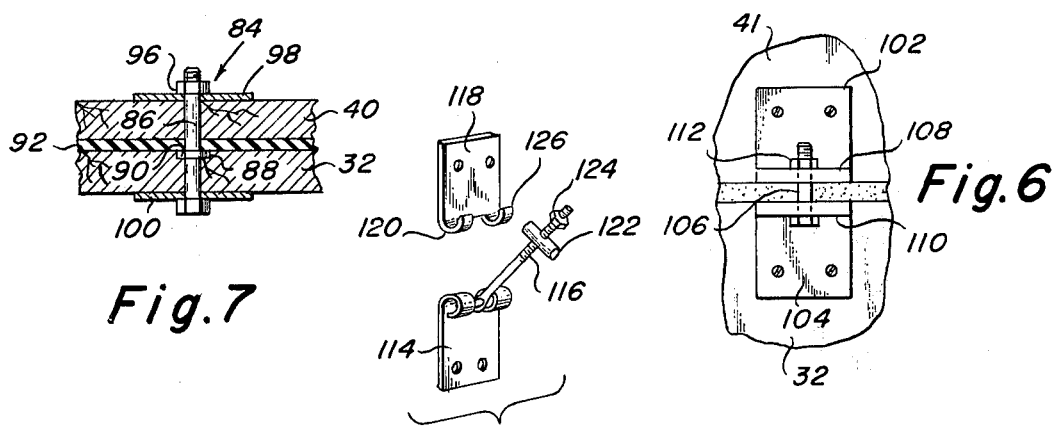
FIG. 6 is an elevation of a connecting assembly suitable for securing the sections of the enclosing structure together.
FIG. 7 is a sectional view of FIG. 5 taken along line 7—7 and viewed in the direction of the arrows.
FIG. 8 is a perspective view of an alternative connecting assembly suitable for use in securing the sections of the enclosing structure together.

Referring now to FIG. 6, an alternative fastening device for connecting the upper and lower frames 41 and 32 is shown. It comprises a pair of L-shaped brackets 102 and 104 which are attached to the frame assemblies 41 and 32, respectively, and extend inwardly therefrom. A bolt 106 passes through the extending portions 108 and 110 which are drawn together by means of nut 112.

Another appropriate mechanism for securing the sections 10 and 12 together comprises a bracket 114, a threaded rod 116 pivotally attached thereto, a bracket 118 having a slotted hook-shaped portions 120 and 126, an elongated locking bar 122 and a nut 124. Bracket 114 would be attached to one of the frame assemblies and bracket 118 to the other. To secure the two assemblies together, rod 116 is rotated to a position between hooks 120 and 126 and bar 122 is urged against them by means of nut 124 thereby drawing the two brackets 118 and 114 together.

An important feature of the present invention is the ability to combine various upper sections with the base section 10 to convert the standard pickup truck T to a small utility truck, large utility truck, or camper. The small utility truck illustrated in FIG. 2 comprises a standard pickup truck to which is attached the base section 10 and roof structure 14 described in conjunction with FIGS. 1, 4, 5, 7, 9 and 10. To convert this vehicle to the large utility truck illustrated in FIG. 1, it is necessary merely to remove the roof structure 14, attach the upper section 12 and then secure roof structure 14 to section 12. FIG. 3 shows a camper unit mounted to a standard pickup truck T and is made up of the base section 10 previously described to which is attached a camper upper unit 128 by one of the means shown in FIGS. 6, 7 or 8. The camper unit 128 is completely enclosed except for that portion which is directly on top of base section 10. The forward portion 130 is enclosed and extends over the cab of the truck T. It is provided with a pair of doors 132 and 134 which are mounted to unit 128 by means of hinges 136 and 138 and include a pair of weather strips 140 and 142. The camper unit 128 may also include a plurality of windows 144 and 146.

Figure 2:
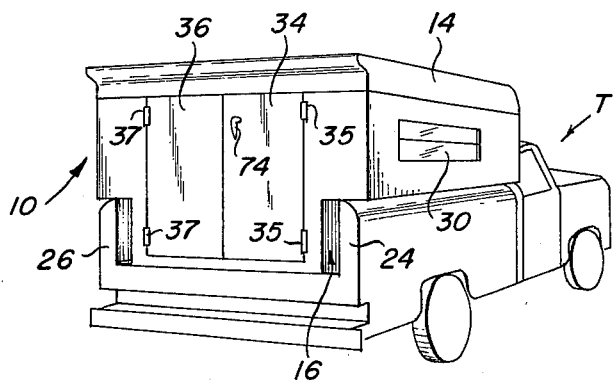
FIG. 2 is a perspective view of the enclosing structure forming a part of the present invention mounted on a standard pickup truck and converting it to a small utility truck.

Since base section 10 is adapted to be connected to roof structure 14, utility truck extension 12 and camper unit 128, any of the vehicles illustrated in FIGS. 1, 2 and 3 may be formed by merely eliminating or interchanging the upper sections 12 and 128. This permits the owner to purchase only the base section 10 and roof structure 14 with the option to rent the larger sections 12 and 128 if their use would be infrequent. Of course, other types of upper sections could be employed depending on the particular type of vehicle body which is desired.

The lifting eyes 80 on roof structure 14 and similar means on the roof of camper unit 128 permit the upper sections 12 or 128 or the entire unit to be lifted off the truck T and stored in a suspended position above the truck in any convenient location, for instance, the garage attic. Should it be desired to convert the small utility truck of FIG. 2 to the camper of FIG. 3, for example, it would merely be necessary to remove the roof structure 14, back the truck T and base section into the garage beneath the suspended camper unit 128, lower the camper unit onto base section 10, fasten the two together by means of one of the fastening devices illustrated in FIGS. 6, 7 and 8 and then drive the assembled truck T, base section 10 and camper unit 128 out of the garage. Similar storage could be provided for the entire assembled units illustrated in FIGS. 1, 2 and 3, if desired.

While this invention has been described as having a preferred design, it will be understood that it is capable of further modification. This application is, therefore, intended to cover any variations, uses or adaptations of the invention following the general principles thereof and including such departures from the present disclosure as come within known or customary practice in the art to which this invention pertains and as may be applied to the essential features hereinbefore set forth and fall within the scope of this invention or the limits of the appended claims.

What is claimed is:

1. An enclosure structure for a pick up truck of the type including a load bed comprising a floor, opposite side panels extending upwardly from the floor, and a tailgate pivoted at the level of the floor, said structure comprising:
   a. a base section adapted to be removably supported on the floor of the bed and lie between the side panels,
   b. said base section having an open top and including an upper edge generally defining the perimeter of said open top,
   c. said base section including a rear wall,
   d. a first opening in said base section rear wall extending to said upper edge,
   e. first door means attached to said base section rear wall and covering said first opening,
   f. an upper section removably supported on said base section and having an open bottom,
   g. means for attaching said upper section to said base section,
   h. said open bottom having a lower edge generally defining the perimeter of said open bottom and the perimeter of said lower edge of said upper section cooperating with the upper edge of said base section and removably secured thereto,
   i. said upper section including a rear wall,
   j. a second opening in said upper section rear wall extending to said bottom lower edge,
   k. a second door means attached to said upper section rear wall covering said second opening and cooperating with said first door means,
   l. said upper section including a forward compartment and only said forward compartment extending substantially forward of said base section and said forward compartment having a closed bottom in advance of said upper section's open bottom,
   m. the closed bottom of said forward compartment lying in substantially the same plane as the open bottom of said upper section, and
   n. a roof covering said upper section.

2. A pick up truck including a cab, a load bed comprising a floor, opposite side panels extending upwardly from the floor and a tailgate and including:
   a. a base section removably supported on the floor of said bed and lying between said side panels,
   b. said base section having an open top and including an upper edge generally defining the perimeter of said open top,
   c. said base section including a rear wall,
   d. a first opening in said base section rear wall extending to said upper edge,
   e. first door means attached to said base section rear wall covering said first opening,
   f. an upper section removably supported on said base section and having an open bottom,
   g. means for attaching said upper section to said base section,
   h. said open bottom having a lower edge generally defining the perimeter of said open bottom, and the lower edge of said open bottom cooperating with the upper edge of said base section and removably secured thereto,
   i. said upper section including a rear wall,
   j. a second opening in said upper section rear wall extending to said bottom edge,
   k. a second door means attached to said upper section rear wall covering said second opening and cooperating with said first door means,
   l. said upper section including a forward compartment and only said forward compartment extending substantially forward of said base section and above and over said pick up cab and said forward compartment having a closed bottom in advance of said upper section's open bottom, and
   m. the closed bottom of said forward compartment lying in substantially the same plane as the bottom edge of said upper section,
   n. said upper edge of said base section lying in substantially the same plane as the bottom edge of said upper section and above the plane of the roof of said cab, and
   o. a roof covering said upper section.

* * * * *